United States Patent [19]

Asperger

[11] 4,336,089
[45] Jun. 22, 1982

[54] METHOD OF PREPARING POLYURETHANE FOAM CARPET UNDERLAY HAVING A BARRIER FILM ATTACHED THERETO

[75] Inventor: Dan A. Asperger, Dalton, Ga.

[73] Assignee: The Dow Chemical Company, Midland, Mich.

[21] Appl. No.: 248,762

[22] Filed: Mar. 30, 1981

[51] Int. Cl.³ .................... B32B 31/16; B32B 31/18
[52] U.S. Cl. .................................. 156/152; 156/247; 156/269; 226/5; 264/46.3
[58] Field of Search ............... 156/152, 247, 249, 272, 156/269; 226/5; 264/46.3

[56]  References Cited

U.S. PATENT DOCUMENTS 3,410,744 11/1968 Böld et al. ................ 156/247 X
4,056,595 11/1977 Bokelmann ................ 264/46.3

Primary Examiner—Edward C. Kimlin
Assistant Examiner—Robert A. Dawson
Attorney, Agent, or Firm—J. G. Carter

[57] ABSTRACT

A polyurethane carpet underlay having a barrier film attached to one side is prepared employing a continuous sheet of film material which serves both as the mold for the polyurethane-forming mixture and the barrier film.

1 Claim, 1 Drawing Figure

METHOD OF PREPARING POLYURETHANE FOAM CARPET UNDERLAY HAVING A BARRIER FILM ATTACHED THERETO

BACKGROUND OF THE INVENTION

Polyurethane foam has been heretofore employed as carpet underlay material. Often, such material contains a barrier film placed on one side thereof.

The present invention provides a method for employing the barrier film as the mold for forming the polyurethane.

SUMMARY OF THE INVENTION

The present invention pertains to a method for preparing polyurethane foam carpet underlay which method comprises:
(A) a frothed, polyurethane-forming mixture applied into a film material;
(B) passing the film containing the frothed, polyurethane-foaming mixture through a gauging device so as to provide a substantially uniform thickness of frothed polyurethane-forming mixture;
(C) contacting the top of the thus gauged, frothed polyurethane-forming mixture with a film material which has been in previous contact with the bottom of said frothed polyurethane-forming mixture and which film that is in contact with the top and bottom of said frothed polyurethane-forming mixture is one continuous piece of film;
(D) curing said gauged frothed polyurethane-forming mixture with said continuous piece of film on top and bottom thereof;
(E) removing said film from the underside of the cured polyurethane and applying said film in a continuous manner to the top of said gauged, frothed, polyurethane-forming mixture in step (C); and
(F) thereafter cutting the thus prepared carpet underlay having a film attached to one surface into desired lengths.

BRIEF DESCRIPTION OF THE DRAWING

The FIGURE is a non-scalar cross section of one method for preparing the carpet underlay material.

DETAILED DECRIPTION OF THE INVENTION

Figure 1:
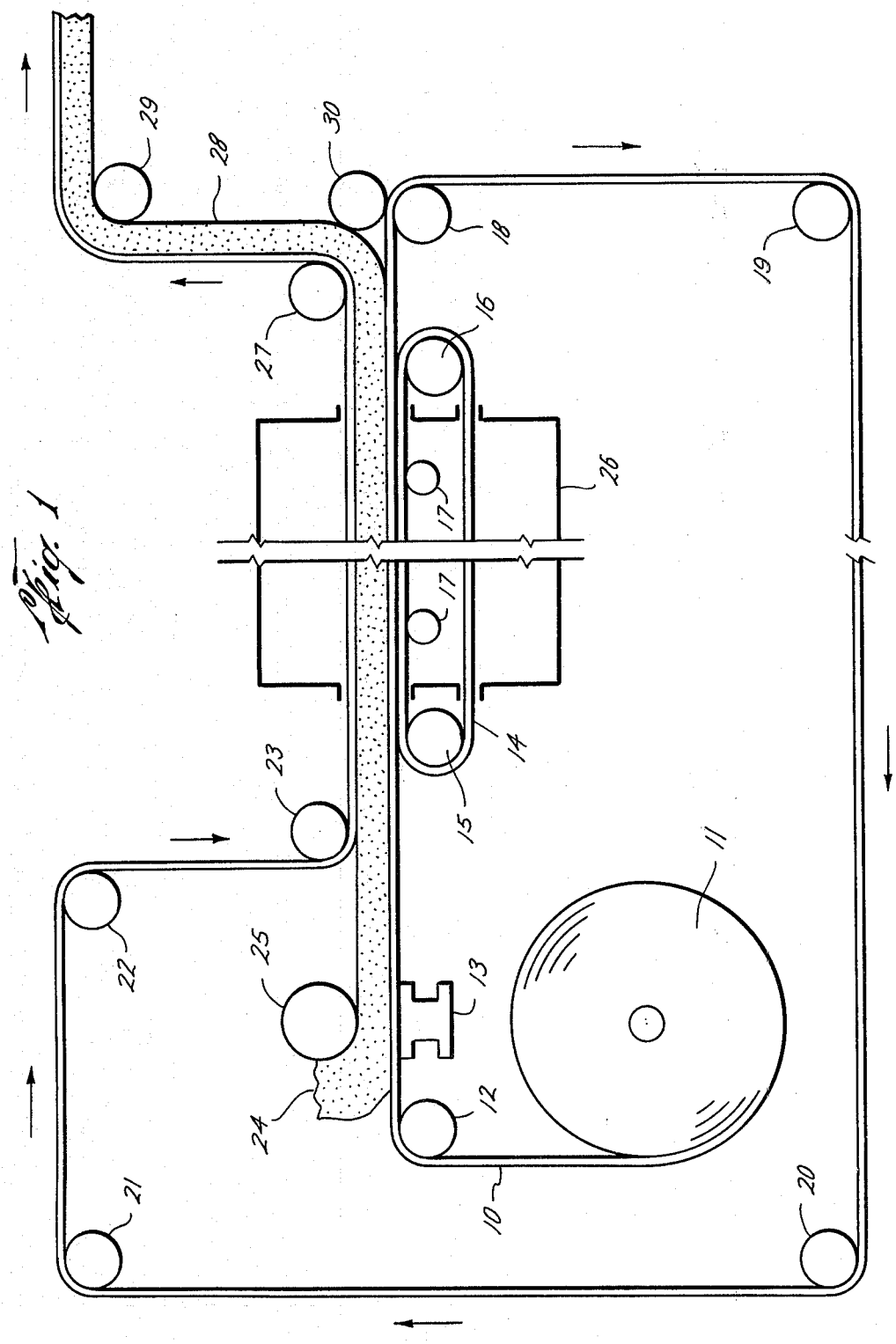

The process of the present invention can be described employing FIG. 1 for illustrative purposes wherein the film material, 10, is fed from supply roll, 11, around direction change roll, 12, across a bed plate, 13, onto a conveyer belt, 14, supported at each end by rolls 15 and 16 and supported therebetween by a plurality of idler rolls, 17, around direction change rolls, 18, 19, 20, 21, 22 and 23. A mass of a frothed polyurethane-forming mixture, 24, is deposited by a means not shown onto said film material prior to contact with a gauging means, 25, illustrated as a doctor roll, thereby forming a sheet of frothed polyurethane-forming mixture on said film material. The gauging means, 25, and the bed plate, 13, are in an adjustable relationship to each other. The top of said sheet of frothed polyurethane-forming mixture is then contacted with said film material at direction change roll 23. The sheet of polyurethane-forming mixture being in contact with said film material on top and bottom then passes through a means, 26, for curing said polyurethane-forming mixture. After passing through said curing means, 26, the bottom portion of said film material is removed by means of direction change roll 18 and the sheet of cured polyurethane having one surface in contact with a film material, 28, is passed around direction change roll, 27 and thereafter a direction change roll, 29. An optional roll, 30, is shown which facilitates removal of the film from the polyurethane. Thereafter, the thus formed carpet underlay is cut into the desired length and rolled-up for storage, all by means not shown.

Any suitable film of non-woven material can be employed in the present invention such as, for example, polyethylene, polyvinylchloride, polypropylene, copolymers of vinyl chloride and vinylidine chloride, polyethylene terephthalate, nylon, multilayer composites of like or any two or more such film or non-woven material and the like.

In some instances it may be desirable, or even preferred, to treat the surface of the film which is to remain in contact with the polyurethane by flame treating, electrostatic arc or other suitable methods to enhance the adhesion of the film material to the polyurethane.

The frothed urethane-forming composition contains (a) one or more polyols, (b) one or more polyisocyanates, (c) one or more catalysts and, optionally, auxilliary blowing agents, fillers, cell control agents, fire retardant agents and the like.

In some instances, the polyurethane may undergo a density reduction between rolls 25 and 27 due to thermal expansion, auxilliary blowing agents and the like.

I claim:

1. A method for preparing polyurethane carpet underlay which method comprises:
(A) a frothed, polyurethane-forming mixture applied onto a film material;
(B) passing the film containing the frothed, polyurethane-forming mixture through a gauging device so as to provide a substantially uniform thickness of frothed polyurethane-forming mixture;
(C) contacting the top of the thus gauged, frothed polyurethane-forming mixture with a film material which has been in previous contact with the bottom of said frothed polyurethane-forming mixture and which film that is in contact with the top and bottom of said frothed polyurethane-forming mixture is one continuous piece of film;
(D) curing said gauged frothed polyurethane-forming mixture with said continuous piece of film on top and bottom thereof;
(E) removing said film from the underside of the cured polyurethane and applying said film in a continuous manner to the top of said gauged, frothed, polyurethane-forming mixture in step (C); and
(F) thereafter cutting the thus prepared carpet underlay having a film attached to one surface into desired lengths.

* * * * *

UNITED STATES PATENT AND TRADEMARK OFFICE
CERTIFICATE OF CORRECTION

PATENT NO. : 4,336,089

DATED : June 22, 1982

INVENTOR(S) : Dan A. Asperger

It is certified that error appears in the above-identified patent and that said Letters Patent are hereby corrected as shown below:

Col. 1, Line 19, "into" should read --onto--; line 21, "thane-foaming" should read --thane-forming--; line 46, "DECRIPTION" should read --DESCRIPTION--; line 49, "the" should read --a--.

Col. 2, line 15, "of" should read --or--; line 20 "more such" should read --more of such--.

Signed and Sealed this

Ninth Day of November 1982

[SEAL]

Attest:

Attesting Officer

GERALD J. MOSSINGHOFF

Commissioner of Patents and Trademarks